(12) United States Patent
Lorentz et al.

(10) Patent No.: US 10,249,857 B2
(45) Date of Patent: Apr. 2, 2019

(54) BATTERY BUS BAR DESIGN AND LASER WELDING

(71) Applicant: GM Global Technology Operations LLC, Detroit, MI (US)

(72) Inventors: Steven Daniel Lorentz, Royal Oak, MI (US); Chih-chang Chen, Rochester Hills, MI (US); Wayne W. Cai, Troy, MI (US); Nikolay Kondratyev, West Bloomfield, MI (US); Roger M. Brisbane, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 85 days.

(21) Appl. No.: 15/466,363

(22) Filed: Mar. 22, 2017

(65) Prior Publication Data
US 2018/0277807 A1    Sep. 27, 2018

(51) Int. Cl.
| | | |
|---|---|---|
| *H01M 2/10* | (2006.01) | |
| *H01M 2/20* | (2006.01) | |
| *B23K 26/21* | (2014.01) | |
| *B23K 101/00* | (2006.01) | |

(52) U.S. Cl.
CPC ........... *H01M 2/1077* (2013.01); *B23K 26/21* (2015.10); *H01M 2/206* (2013.01); *B23K 2101/006* (2018.08); *H01M 2220/20* (2013.01)

(58) Field of Classification Search
CPC ............ H01M 2/02; H01M 2/10; H01M 2/12; H01M 2/20; B23K 26/00; B23K 26/242
See application file for complete search history.

(56) References Cited

U.S. PATENT DOCUMENTS

| | | | |
|---|---|---|---|
| 3,507,696 A * | 4/1970 | Langer Alois .......... | H01M 4/52 429/206 |
| 8,409,744 B2 | 4/2013 | Ijaz et al. | |
| 2011/0229754 A1 | 9/2011 | Zhao et al. | |
| 2012/0196170 A1* | 8/2012 | Ijaz ................... | H01M 10/0468 429/120 |
| 2013/0029206 A1* | 1/2013 | Lev ....................... | H01M 2/206 429/161 |
| 2013/0130100 A1* | 5/2013 | Kurata .................. | H01M 2/024 429/179 |
| 2015/0111093 A1* | 4/2015 | Callicoat ............... | H01M 2/305 429/178 |
| 2016/0043376 A1* | 2/2016 | Choi ....................... | H01M 2/30 429/121 |

* cited by examiner

*Primary Examiner* — Kenneth J Douyette
(74) *Attorney, Agent, or Firm* — Harness, Dickey & Pierce, P.L.C.

(57) ABSTRACT

A battery assembly includes a plurality of battery cells each including a cell tab and a bus bar connected to the cell tabs of adjacent battery cells. The bus bar including a pair of 180 degree bend regions that each define a channel for receiving a respective cell tab and a cut-out region defining an opening having opposing edge portions that allows direct access to the cell tab within the cut-out region. A weld line connects the cell tab to at least one of the opposing edge portions within the cut-out region.

9 Claims, 4 Drawing Sheets

BATTERY BUS BAR DESIGN AND LASER WELDING

FIELD

The present disclosure relates to a battery bus bar design and laser welding methods.

BACKGROUND

This section provides background information related to the present disclosure which is not necessarily prior art.

A battery assembly for hybrid, plug-in electric (EV), or other type vehicles includes a plurality of battery cells. Cooling fins, repeating frames and foams, and the battery cells are stacked to form a battery module or battery pack. The battery module for a long driving range EV may contain hundreds of battery cells.

Currently, after stacking and assembling the battery cells and other components into the battery module, every two or three adjacent battery cells are welded together with U-channel bus bar sheet metals to form serial/parallel electric connections. Specifically, each of the battery cells has at least two tabs or electric terminals (one positive, one negative) that are welded to the U-channel bus bar sheet metals. In certain applications, the tabs of each of the battery cells are bent such that the tips of the tabs are aligned after welding. Unfortunately, due to the difficulty of precise tab bending and position control during welding, uneven tab height still exists. Uneven and misaligned tabs affect the overall weld quality between the tabs and the U-channel bus bar sheets. Furthermore, because of the irreversible nature of current welding techniques, such as laser welding and ultrasonic welding, removing a defective or "bad" battery cell from a fully assembled battery module requires cutting all of the tab connections in the battery module, thereby rendering the "good" battery cells unusable for re-weld or restoration to another battery module.

It would be desirable to develop a battery module and a method of assembling the battery module that is more reliable and less susceptible to defects.

SUMMARY

This section provides a general summary of the disclosure, and is not a comprehensive disclosure of its full scope or all of its features.

A battery assembly includes a plurality of battery cells each including a cell tab and a bus bar connected to the cell tabs of adjacent battery cells. The bus bar including a pair of 180 degree bend regions that each defines a channel for receiving a respective cell tab and a cut-out region defining an opening having opposing edge portions that allows direct access to the cell tab within the cut-out region. A weld line connects the cell tab to at least one of the opposing edge portions within the cut-out region.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
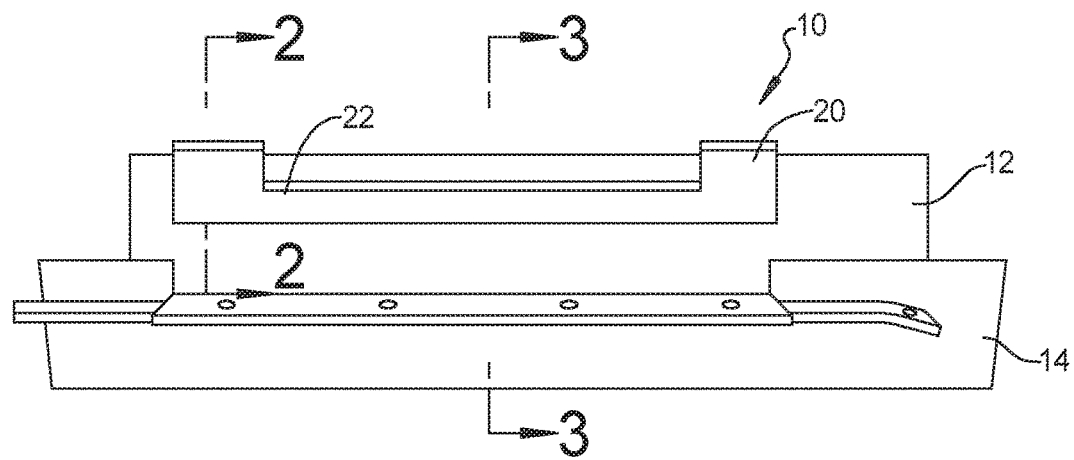
FIG. 1 is a side perspective view of a bus bar according to the present disclosure connected to a cell tab.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
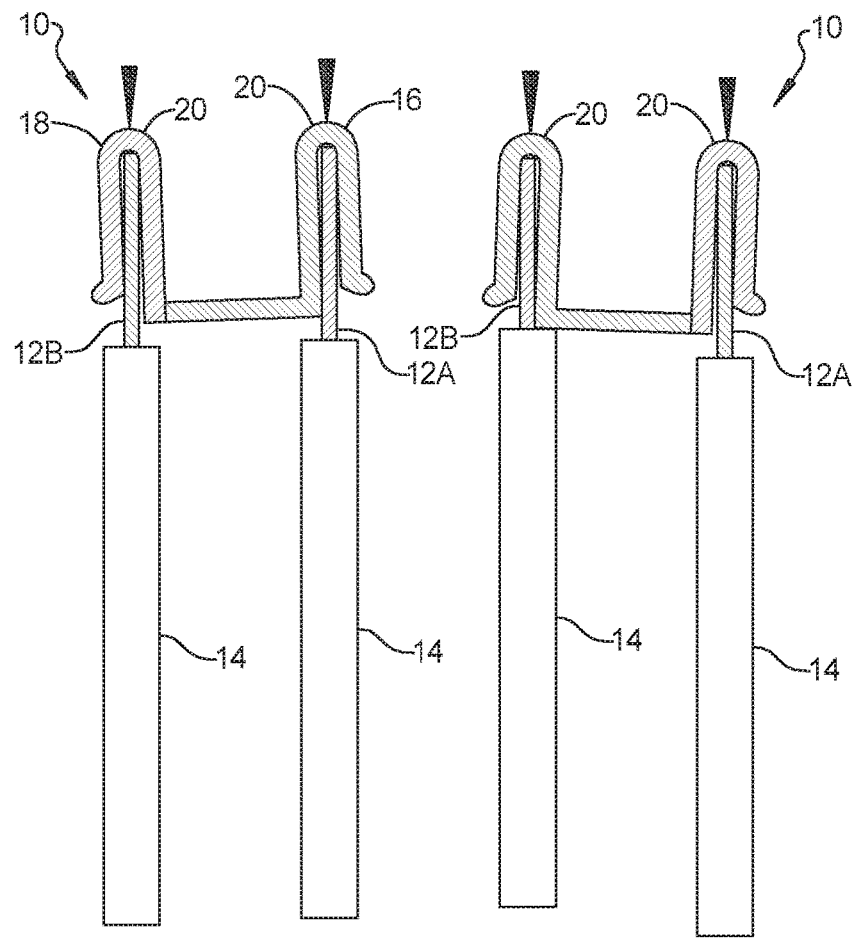
FIG. 2 is a cross-sectional view taken along line 2-2 of FIG. 1 of the bus bar connected to a cell tab according to the principles of the present disclosure.
Figure 3:
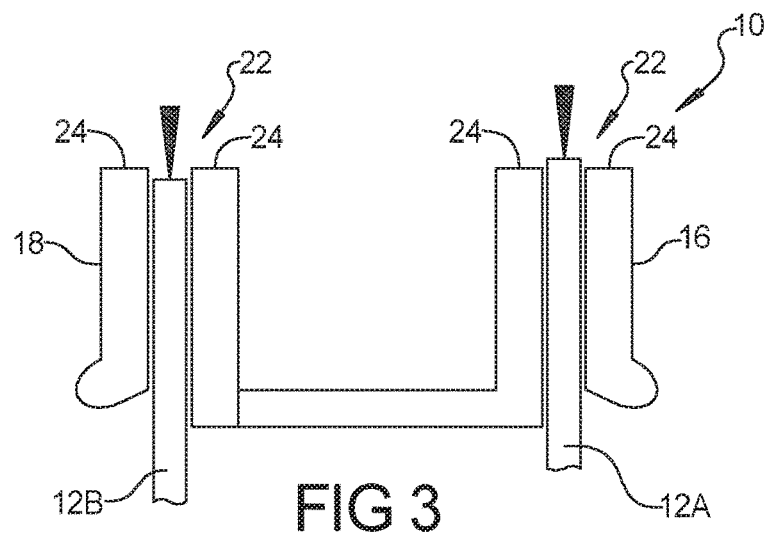
FIG. 3 is a cross-sectional view taken along line 3-3 of FIG. 1 of the bus bar connected to a cell tab according to the principles of the present disclosure.

With reference to FIGS. 1-3, a bus bar 10 is shown connected to a cell tab 12 of a battery cell 14. As shown in FIG. 2, a battery module uses a group of bus bars 10, each including a copper portion 16 that is laser welded to a group of negative cell tabs/terminals 12A which are made of a copper material, and an aluminum portion 18 that is laser welded to a group of positive cell tabs/terminals 12B made of an aluminum material. Each of the copper and aluminum portions 16, 18 of the bus bars include a 180-degree bend region 20 that defines a generally U-shaped cross section in which the cell tabs/terminals 12A, 12B are nested during assembly.

As shown in FIGS. 1 and 3, a cut-out region 22 is provided along a portion of the bus bar 10 that is between a pair of bend regions 20. As shown in FIG. 3, the cut-out region 22 defines an opening having opposing edge portions 24 between which the cell tab 12 is received. The cut-out region 22 allows direct access to the surfaces of the cell tab 12 and the edge regions 24 for welding.

As shown in FIG. 2, the bus bar 10 is free floating so that it is capable of reducing gaps in the laser welding and thereby improve weld quality on the welds. By free floating it is meant that the bus bar 10 is not embedded in a rigid molding that inhibits the movement of the bus bar 10. Therefore, there will be reduced stresses on the welds due to vibrations in service. As shown in FIG. 2, the position of the adjacent battery cells 14 are shown misaligned with the free floating bus bars 10 nonetheless shown cocked for fully receiving the misaligned cell tabs 12 therein.

In addition, with reference to FIG. 3, the cut-out region allows either a butt joint or fillet joint welding operation for connecting the cell tabs 12 to the bus bars 10 without associated problems that occur due to varying gaps in bus bars without a cut-out region or that are not free floating.

Figure 4:
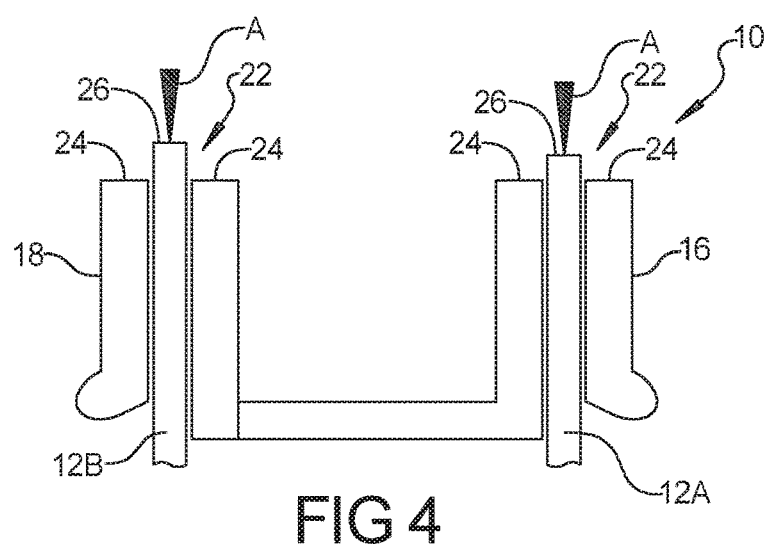
FIG. 4 is a cross-sectional view similar to FIG. 3 wherein the cell tabs extend out of the cut-out region of the bus bar and illustrating a butt welding connecting option.

As shown in FIG. 4, the depth of the cut-out regions 22 between the bends 20 can be deep enough so that the cell tabs 12 extend beyond the opposing edges 24 so that the extending portion 26 of the cell tabs 12 provide "filler material" for butt welding in a direction of the arrows "A" shown.

Figure 5:
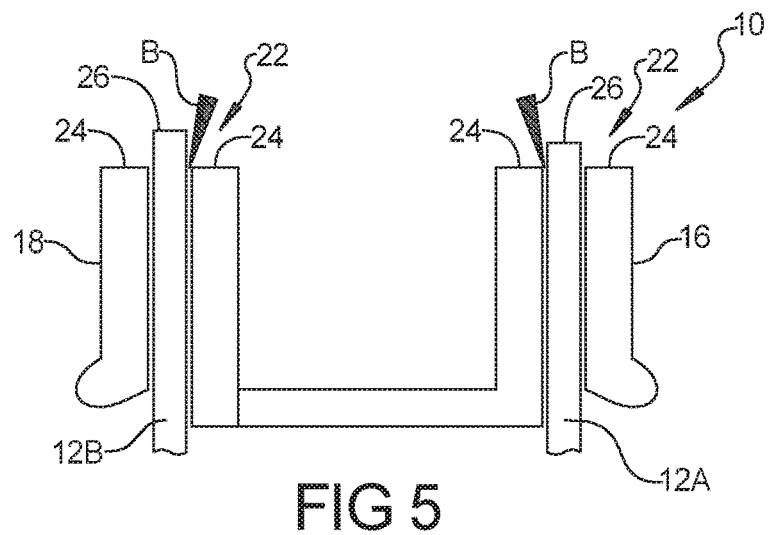
FIG. 5 is a cross-sectional view similar to FIG. 3 wherein the cell tabs extend out of the cut-out region of the bus bar and illustrating a fillet welding connecting option.

Alternatively, as shown in FIG. 5, the cut-out regions 22 between the bends 20 can be deep enough so that the cell tabs 12 extend beyond the opposing edges 24 so that the extending portion 26 of the cell tabs 12 enable fillet welding in a direction of the arrows "B" shown.

Figure 6:
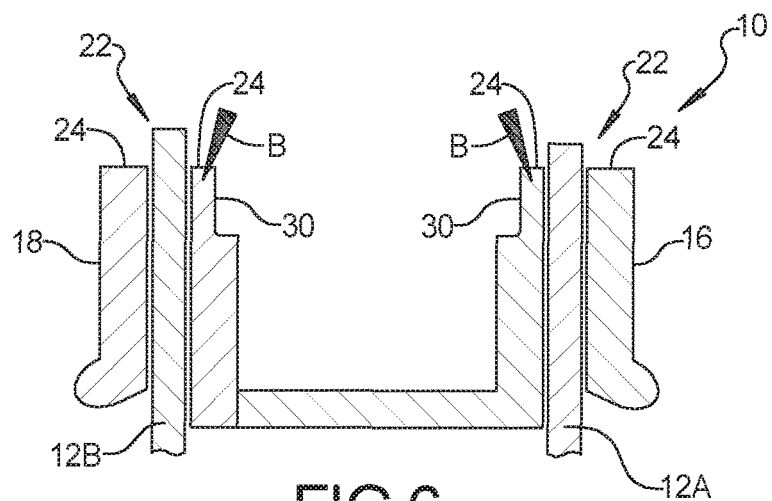
FIG. 6 is a cross-sectional view similar to FIG. 3 wherein the cell tabs extend out of the cut-out region of the bus bar and illustrating a reduced thickness coining edge along the cut-out region for reducing laser energy required for the welding operation.
Figure 7:
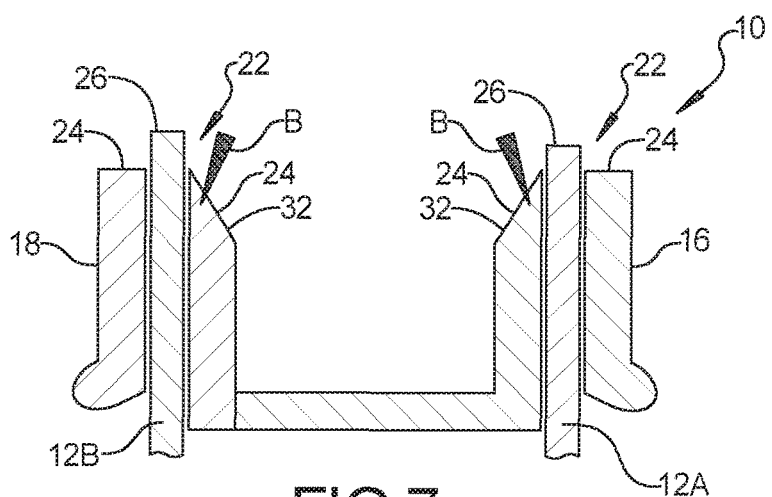
FIG. 7 is a cross-sectional view similar to FIG. 3 wherein the cell tabs extend out of the cut-out region of the bus bar and illustrating a wedge shaped edge along the cut-out region for reducing laser energy required for the welding operation.

As a further alternative, as shown in FIG. 6, at least one of the edges 24 along the cut out region 22 can be coined with a step region 30 for providing a reduced thickness region requiring lower laser energy for a fillet weld "B". Alternatively, the edge 24 can be formed in a wedge shape 32 as shown in FIG. 7 for providing a reduced thickness region requiring lower laser energy for a fillet weld "B". The reduced thickness obtained by coining or wedging at the weld joint provides for even heat distribution.

Figure 8:
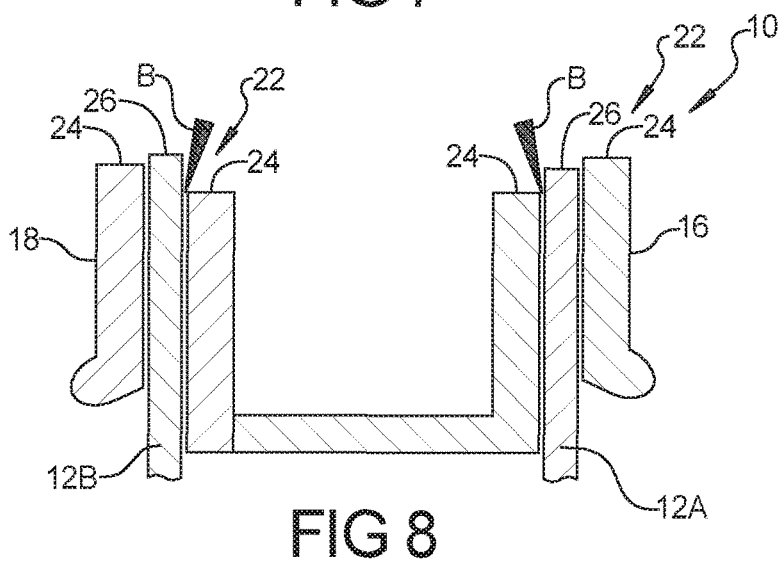
FIG. 8 is a cross-sectional view similar to FIG. 3 wherein the cell tabs extend out of the cut-out region of the bus bar and illustrating opposing edges along the cut-out region having two different levels for increasing the laser welding target size and absorbing heat from the welding operation, preventing laser over-welding by penetrating the tab, and absorbing more heat.

With reference to FIG. 8, the bus bar 10 is shown including opposing edges 24 along the cut-out region 22 having two different levels for increasing the laser welding target size and absorbing heat from the welding operation. The uneven edges 24 of the bus bar 10 and extending portion 26 of the cell tabs 12 provides a fail-safe condition if the weld were off target, and in over-welding conditions when the tab is completely melted, and help absorb additional heat for the fillet weld in the direction of the arrows "B".

Figure 9:
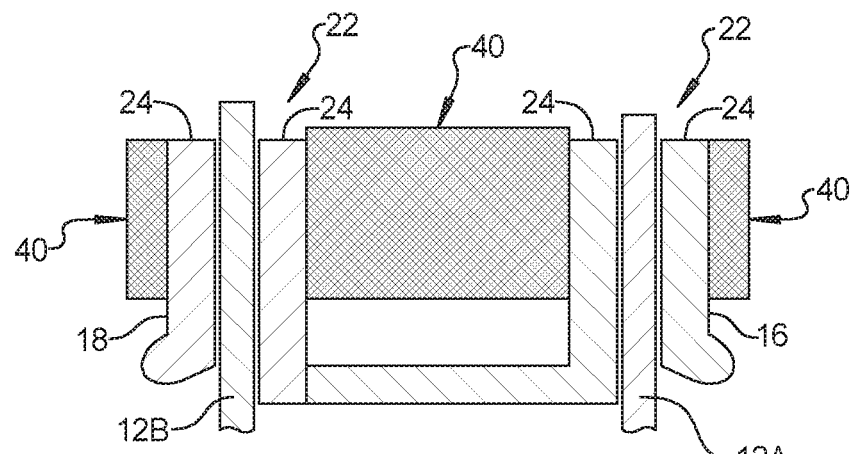
FIG. 9 is a cross-sectional view similar to FIG. 3 wherein the cell tabs extend out of the cut-out region of the bus bar and illustrating a clamp device engaging the bus bar during a welding operation.

With reference to FIG. 9, the bus bar 10 and cell tabs 12A, 12B can be clamped by a clamp mechanism 40 during the welding operation. The clamp mechanism 40 can close the metal gaps and enhance heat dissipation during the welding operation.

Figure 10:
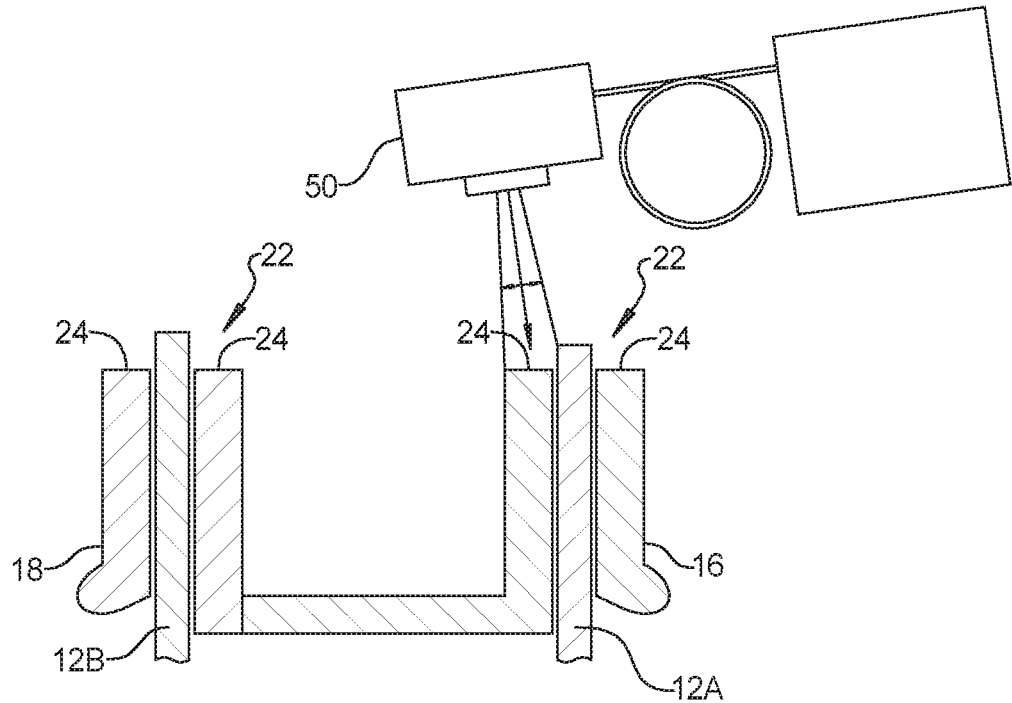
FIG. 10 is a cross-sectional view similar to FIG. 3 wherein the cell tabs extend out of the cut-out region of the bus bar and illustrating an oscillating laser welding operation for improved quality and reduced heat input.

As shown in FIG. 10, the weld process can be performed using an oscillating laser welder 50.

Precision laser welding is used to partially melt and metallurgically connect the edges 24 of the bus bars 10 to the terminals 12 in order to avoid ultrasonic welding that could inflict too much energy into a cell terminal 12 and in turn damage a cell's internal electrical connections. During welding, laser energy will be aimed at this surface. The result is that the bus bar 10 and battery terminal 12 are attached to each other along the length of the cut-out region 22 in which the battery terminal 12 resides.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of connecting a bus bar to a cell tab of a battery cell, comprising:

forming a metallic bus bar having a pair of 180 degree bend regions that each define a channel, the pair of 180 degree bend regions each having a cut-out region defining an opening having opposing edge portions;

inserting a pair of thin plate-like cell tabs of a pair of battery cells into respective channels of the metallic bus bar; and welding each of the pair of thin plate-like cell tabs to at least one of the opposing edge portions of the respective cut-out regions.

2. The method according to claim 1, further including clamping the metallic bus bar and pair of thin plate-like cell tabs with a clamping mechanism prior to welding the thin plate-like cell tab to at least one of the opposing edge portions.

3. The method according to claim 1, wherein the at least one of the opposing edge portions has a coined edge with a step region of reduced thickness.

4. The method according to claim 1, wherein the at least one of the opposing edge portions has a wedge shaped edge having a tapering thickness.

5. The method according to claim 1, wherein the step of welding includes a fillet weld.

6. The method according to claim 1, wherein the step of welding includes a butt weld.

7. The method according to claim 1, wherein the opposing edge portions have differing heights and the one of the opposing edge portions has a height that is shorter than the other of the opposing edge portions.

8. The method according to claim 1, wherein the pair of thin plate-like cell tabs extend above the one of the opposing edge portions.

9. The method according to claim 1, wherein the step of welding includes the use of an oscillating laser welder.

* * * * *